(12) United States Patent
Baldwin et al.

(10) Patent No.: US 12,055,477 B2
(45) Date of Patent: Aug. 6, 2024

(54) COMPRESSED GAS CLEANING OF WINDOWS IN PARTICLE CONCENTRATION MEASUREMENT DEVICE

(71) Applicant: Kidde Technologies, Inc., Wilson, NC (US)

(72) Inventors: Eli Baldwin, Knightdale, NC (US); Benjamin Jackson, Fairfax, VA (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 344 days.

(21) Appl. No.: 17/489,644

(22) Filed: Sep. 29, 2021

(65) Prior Publication Data

US 2023/0095478 A1    Mar. 30, 2023

(51) Int. Cl.
*G01N 21/15* (2006.01)
*G01N 21/61* (2006.01)

(52) U.S. Cl.
CPC ............ *G01N 21/15* (2013.01); *G01N 21/61* (2013.01); *G01N 2021/151* (2013.01)

(58) Field of Classification Search
CPC ... G01N 21/15; G01N 21/61; G01N 2021/151
See application file for complete search history.

(56) References Cited

U.S. PATENT DOCUMENTS

| | | | | |
|---|---|---|---|---|
| 3,628,028 A | * | 12/1971 | Thorsheim | G01N 21/15 250/576 |
| 3,728,071 A | * | 4/1973 | Mutchler | F23D 14/00 239/405 |
| 4,836,689 A | | 6/1989 | O'Brien et al. | |

(Continued)

FOREIGN PATENT DOCUMENTS

| | | |
|---|---|---|
| CN | 207689323 U | 8/2018 |
| CN | 209559715 U | 10/2019 |

(Continued)

OTHER PUBLICATIONS

Abstract DE202015102319 (U1), Published: Aug. 9, 2016, 1 page.

(Continued)

*Primary Examiner* — Tri T Ton
*Assistant Examiner* — Jarreas C Underwood
(74) *Attorney, Agent, or Firm* — CANTOR COLBURN LLP

(57) ABSTRACT

A particle concentration measurement system includes a first window and a second window separated by a sensing volume. The system also includes one or more supports to provide structural support for the first window at a first end and for the second window at a second end, opposite the first end, of each of the one or more supports. The sensing volume is defined by the one or more supports and the first window and the second window is open to an environment of the particle concentration measurement system adjacent to the one or more supports such that particle-laden gas from the environment that includes particles mixed with other materials enters the sensing volume. A first compressed gas orifice directs compressed gas onto the first window to clean the first window and a second compressed gas orifice directs the compressed gas onto the second window to clean the second window.

20 Claims, 3 Drawing Sheets

(56) References Cited

U.S. PATENT DOCUMENTS

| | | | | |
|---|---|---|---|---|
| 4,896,047 A * | 1/1990 | Weaver | | G01N 21/534 |
| | | | | 250/573 |
| 5,191,878 A * | 3/1993 | Iida | | A61B 1/126 |
| | | | | 600/157 |
| 5,374,992 A | 12/1994 | Pye et al. | | |
| 6,181,426 B1 * | 1/2001 | Bender | | G01N 21/3504 |
| | | | | 356/432 |
| 6,421,127 B1 * | 7/2002 | McAndrew | | B08B 17/02 |
| | | | | 356/440 |
| 7,319,524 B2 | 1/2008 | Friedrichs | | |
| 11,454,582 B2 * | 9/2022 | Washizu | | G08B 17/00 |
| 2007/0298362 A1 * | 12/2007 | Rocha-Alvarez | ... | F27B 17/0025 |
| | | | | 219/385 |
| 2009/0253965 A1 * | 10/2009 | Miyamoto | | A61B 1/042 |
| | | | | 600/157 |
| 2012/0236323 A1 * | 9/2012 | Kuoppa | | G01N 21/85 |
| | | | | 356/634 |
| 2015/0077754 A1 | 3/2015 | Schumann et al. | | |
| 2016/0003736 A1 * | 1/2016 | Gigler | | G01N 21/53 |
| | | | | 356/338 |
| 2016/0033763 A1 | 2/2016 | Shields et al. | | |
| 2019/0160317 A1 * | 5/2019 | Kallergis | | B64D 45/00 |

FOREIGN PATENT DOCUMENTS

| | | |
|---|---|---|
| CN | 111474095 A | 7/2020 |
| DE | 202015102319 U1 | 8/2016 |
| FR | 2667941 A1 | 4/1992 |
| GB | 2288231 A | 10/1995 |
| JP | 2003279466 A | 10/2003 |

OTHER PUBLICATIONS

Abstract of FR2667941 (A1), Published: Apr. 17, 1992, 1 page.
European Search Report Application No. 22192242.0, mailed Feb. 2, 2023, 70 pages.

* cited by examiner

COMPRESSED GAS CLEANING OF WINDOWS IN PARTICLE CONCENTRATION MEASUREMENT DEVICE

BACKGROUND

Exemplary embodiments pertain to the art of fire suppression and, in particular, to compressed gas cleaning of windows in a particle concentration measurement device.

Fire suppression systems deploy agents to extinguish a fire. Halon, a liquified compressed gas that stops the spread of fire by chemically disrupting combustion, is being replaced as a fire-suppression agent due to its contribution to ozone depletion. Alternative fire suppressive agents include dry solid particulates that are dispersed within an environment. The distribution and concentration of the particulates within the environment are factors in the effectiveness of the fire suppression system. As such, measurement of the concentration of a fire suppression agent is an important part of the fire suppression effort using these particulates. A concentration measurement device may include windows on either end of a sensing volume.

BRIEF DESCRIPTION

In one embodiment, a particle concentration measurement system includes a first window and a second window separated by a sensing volume. The system also includes one or more supports to provide structural support for the first window at a first end and for the second window at a second end, opposite the first end, of each of the one or more supports. The sensing volume defined by the one or more supports and the first window and the second window is open to an environment of the particle concentration measurement system adjacent to the one or more supports such that particle-laden gas from the environment that includes particles mixed with other materials enters the sensing volume. A first compressed gas orifice directs a compressed gas onto the first window to clean the first window and a second compressed gas orifice directs the compressed gas onto the second window to clean the second window.

Additionally or alternatively, in this or other embodiments, the particle concentration measurement system also includes one or more containers to store the compressed gas and channel the compressed gas to the first compressed gas orifice and the second compressed gas orifice.

Additionally or alternatively, in this or other embodiments, the particle concentration measurement system also includes a first collar disposed between the first window and a center of the sensing volume, wherein the first compressed gas orifice is between the first window and the first collar, and the first collar includes an inner edge and an outer edge, opposite the inner edge.

Additionally or alternatively, in this or other embodiments, the particle concentration measurement system also includes a second collar disposed between the second window and the center of the sensing volume, wherein the second compressed gas orifice is between the second window and the second collar, and the second collar includes an inner edge and an outer edge, opposite the inner edge.

Additionally or alternatively, in this or other embodiments, the inner edge of the first collar forms an opening for the first window and the inner edge of the second collar forms an opening for the second window such that the sensing volume extends from the first window to the second window.

Additionally or alternatively, in this or other embodiments, the outer edge of the first collar and the outer edge of the second collar are shaped to channel the compressed gas away from the sensing volume.

Additionally or alternatively, in this or other embodiments, the particle concentration measurement system also includes a light source to emit incident light into the sensing volume via a fiber optic cable. The incident light enters the sensing volume through the first window and interacts with the particle-laden gas in the sensing volume.

Additionally or alternatively, in this or other embodiments, the particle concentration measurement system also includes a detector configured to detect light intensity following interaction in the sensing volume.

Additionally or alternatively, in this or other embodiments, the particle concentration measurement system also includes a controller to determine a concentration of the particles in the particle-laden gas in the interaction region based on the intensity measured by the detector.

Additionally or alternatively, in this or other embodiments, the particles act as a fire suppression agent.

In another embodiment, a method of assembling a particle concentration measurement system includes arranging a first window and a second window separated by a sensing volume, and arranging one or more supports to provide structural support for the first window at a first end and for the second window at a second end, opposite the first end, of each of the one or more supports. The sensing volume defined by the one or more supports and the first window and the second window is open to an environment of the particle concentration measurement system adjacent to the one or more supports such that particle-laden gas from the environment that includes particles mixed with other materials enters the sensing volume. The method also includes arranging a first compressed gas orifice to direct a compressed gas onto the first window to clean the first window and arranging a second compressed gas orifice to direct the compressed gas onto the second window to clean the second window.

Additionally or alternatively, in this or other embodiments, the method also includes disposing one or more containers to store the compressed gas and channel the compressed gas to the first compressed gas orifice and the second compressed gas orifice.

Additionally or alternatively, in this or other embodiments, the method also includes arranging a first collar disposed between the first window and a center of the sensing volume, wherein the first compressed gas orifice is between the first window and the first collar, and the first collar includes an inner edge and an outer edge, opposite the inner edge.

Additionally or alternatively, in this or other embodiments, the method also includes arranging a second collar disposed between the second window and the center of the sensing volume, wherein the second compressed gas orifice is between the second window and the second collar, and the second collar includes an inner edge and an outer edge, opposite the inner edge.

Additionally or alternatively, in this or other embodiments, the arranging the first collar includes the inner edge of the first collar forming an opening for the first window and the arranging the second collar includes the inner edge of the second collar forming an opening for the second window such that the sensing volume extends from the first window to the second window.

Additionally or alternatively, in this or other embodiments, the arranging the first collar and the second collar includes the outer edge of the first collar and the outer edge of the second collar being shaped to channel the compressed gas away from the sensing volume.

Additionally or alternatively, in this or other embodiments, the method also includes arranging a light source to emit incident light into the sensing volume via a fiber optic cable, wherein the incident light enters the sensing volume through the first window and interacts with the particle-laden gas in the sensing volume.

Additionally or alternatively, in this or other embodiments, the method also includes arranging a detector to detect light intensity following interaction in the sensing volume.

Additionally or alternatively, in this or other embodiments, the method also includes configuring a controller to determine a concentration of the particles in the particle-laden gas in the interaction region based on the intensity measured by the detector.

Additionally or alternatively, in this or other embodiments, determining the concentration of the particles includes determining the concentration of a fire suppression agent.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, the distribution and concentration of dry solid particulates used for fire suppression can affect the result of the suppressive effort. Thus, a fire suppression agent concentration measurement device may be used to measure concentration in real time. A set of such devices may be used in different areas of a given environment to also determine distribution. The measurements may be used to control the release of additional fire suppression agent as needed, for example.

One approach to measuring the concentration of fire suppression agent in the environment involves transmitting light through a sensing volume in which the light interacts with a sample of gas from the environment. The sensing volume may be between two windows of the concentration measurement device. The introduction of light into the sensing volume is through a first window. The intensity of the light that has interacted with the gas from the environment is measured, and a decrease in the intensity is correlated to a concentration of the fire suppression agent in the gas. Over time, particles of the fire suppressive agent may build up on the windows. This buildup impedes light transmission through the windows, thus preventing the accurate measurement of the concentration of the fire suppression agent.

Embodiments of the systems and methods detailed herein relate to compressed gas cleaning of windows in a particle concentration measurement device. The particles of interest may be particles of a fire suppression agent, for example. As detailed, compressed gas such as nitrogen or air is blown against and across the windows of the particle concentration measurement device through which light is transmitted. In exemplary embodiments, a collar may be added between each window and the sensing volume to ensure that the compressed gas that flows across the window does not affect the particle concentration measurement in the sensing volume. While windows are specifically depicted and discussed, the particle concentration measurement device according to alternate embodiments may have optically sensitive components (e.g., light emitter, light receivers, mirror) that are directly exposed to the environment. The compressed air flow detailed herein is equally applicable to such an alternate embodiment to prevent fire suppression agent from settling on the optically sensitive components.

Figure 1:
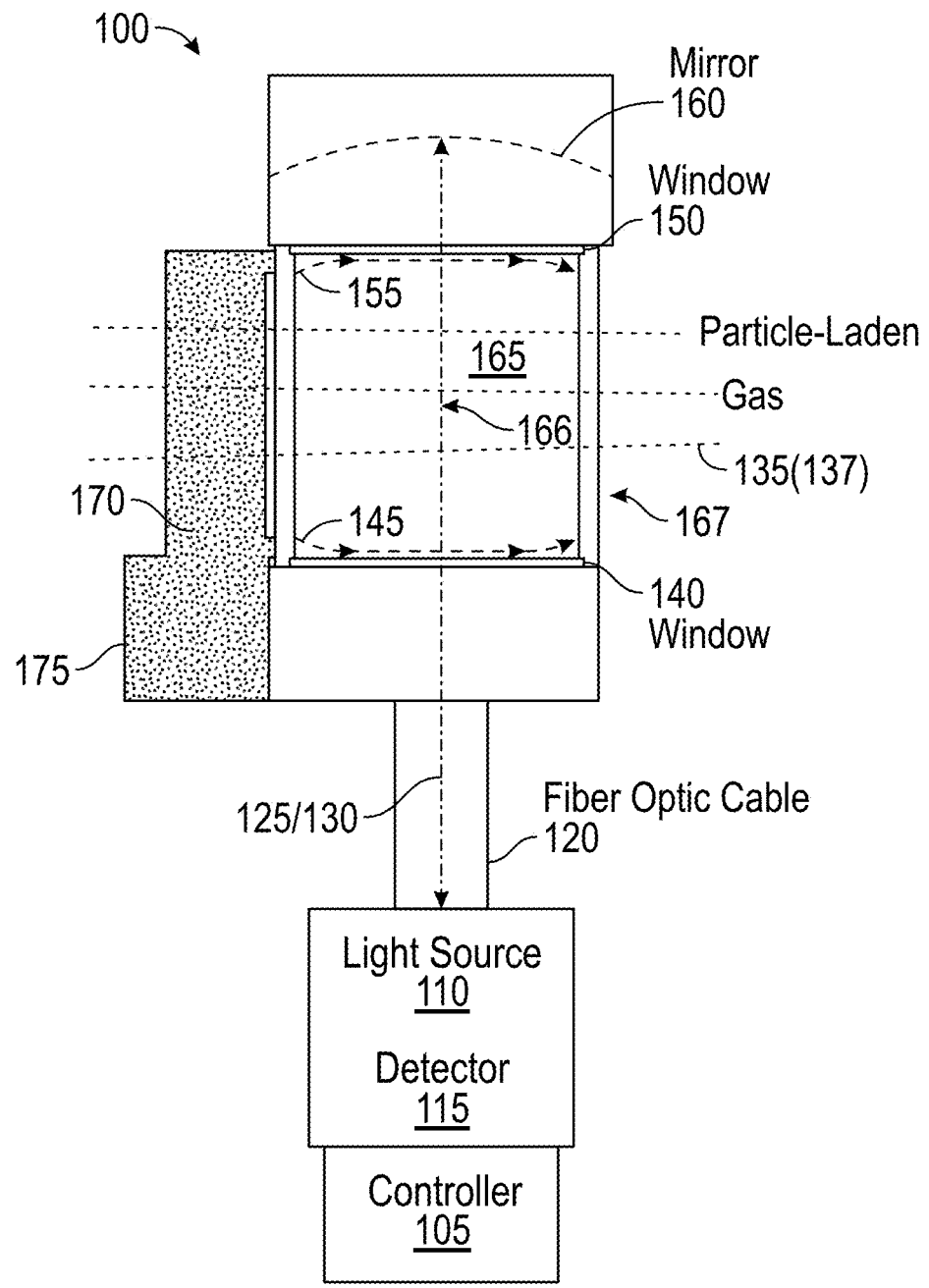
FIG. 1 is a block diagram of a particle concentration measurement device that employs compressed gas to clean windows according to one or more embodiments.

FIG. 1 is a block diagram of a particle concentration measurement device 100 that employs compressed gas to clean windows 140, 150 according to one or more embodiments. The particle concentration measurement device 100 is disposed in an environment in which a solid particle fire suppression agent is dispersed, for example. The particles 137 mix with air and other materials in the environment to create particle-laden gas 135. The particle concentration measurement device 100 measures the concentration of the particles 137 of fire suppression agent in the particle-laden gas 135 in the environment.

The particle-laden gas 135 flows freely into a sensing volume 165, which is open to the environment. The supports 167 that provide structural support for the windows 140, 150 on either side do not enclose the sensing volume 165 but, instead, define gaps through which particle-laden gas 135 may flow through the sending volume 165. A center 166 of the sensing volume 165, which is defined by the supports 167 and the windows 140, 150 is indicated for explanatory purposes. The interaction of incident light 125 and particle-laden gas 135 in the sensing volume 165 forms the basis of determining the concentration of particles 137 in the particle-laden gas 135.

A light source 110 emits incident light 125 via a fiber optic cable 120 into the sensing volume 165. Specifically, the incident light 125 is directed into the sensing volume 165 through the window 140 and exits the sensing volume 165 through the window 150. The incident light 125 that has interacted with particle-laden gas 135 in the sensing volume 165 is reflected by a mirror 160 as reflected light 130. The reflected light 130 re-enters the sensing volume 165 through the window 150 and is exits the sensing volume 165 through the window 140. The reflected light 130 and, more specifically, intensity of the reflected light 130 is detected by a detector 115. A controller 105 then uses the measured intensity of the reflected light 130 to determine the concentration of the particles 137 (e.g., of fire suppression agent) in the particle-laden gas 135. A mapping of measured intensity to concentration may be in the form of a look-up table, for example. According to an alternate embodiment, the detector 115, and optionally also the controller 105, may be positioned to replace the mirror 160. In that case, incident light 125 that flowed through the sensing volume 165 is detected on the other side of the window 150 and there is no reflected light 130.

As previously noted, if particle-laden gas 135 and/or the particles 137 settle on the windows 140, 150, transmission of the light 125/130 may be impeded and, as a result, the accuracy of the concentration measurement may be affected. According to one or more embodiments, the windows 140, 150 are cleaned using compressed gas 170 (e.g., nitrogen). A container 175 of the compressed gas 170 channels the compressed gas 170 to orifices 145, 155 that are respectively arranged to direct the compressed gas 170 onto and across the windows 140, 150. While one container 175 is shown, each of the orifices 145, 155 may be supplied by a different container 175 in alternate embodiments.

Figure 2:
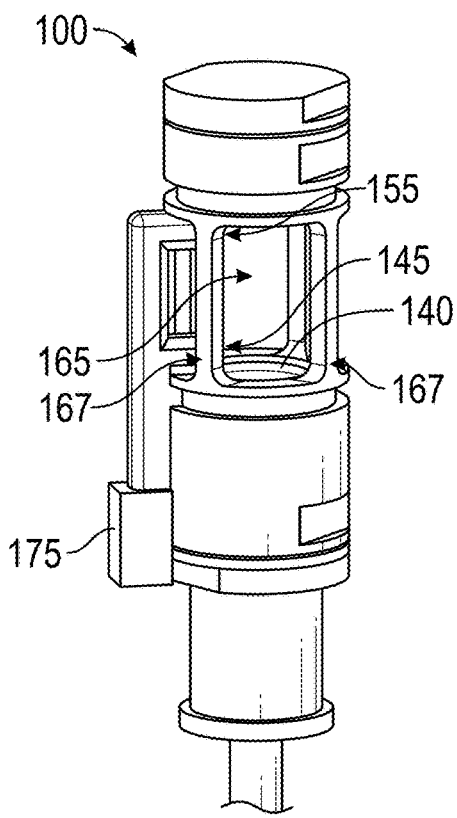
FIG. 2 is an isometric view of aspects of the particle concentration measurement device according to one or more embodiments.

FIG. 2 is an isometric view of aspects of the particle concentration measurement device 100 according to one or more embodiments. The view in FIG. 2 shows that the sensing volume 165 is open to the environment around the particle concentration measurement device 100 because of gaps between the supports 167. The window 140 is visible in FIG. 2. The arrangement of a container 175 for compressed gas 170 and orifices 145, 155 to direct the compressed gas 170 onto the windows 140, 150 is also shown. The container 175 need not be arranged as shown in the exemplary embodiment of FIG. 2. Instead, a mating orifice for a hose may be coupled to the particle concentration measurement device 100 to couple the particle concentration measurement device 100 to a source of the compressed gas 170.

Figure 3:
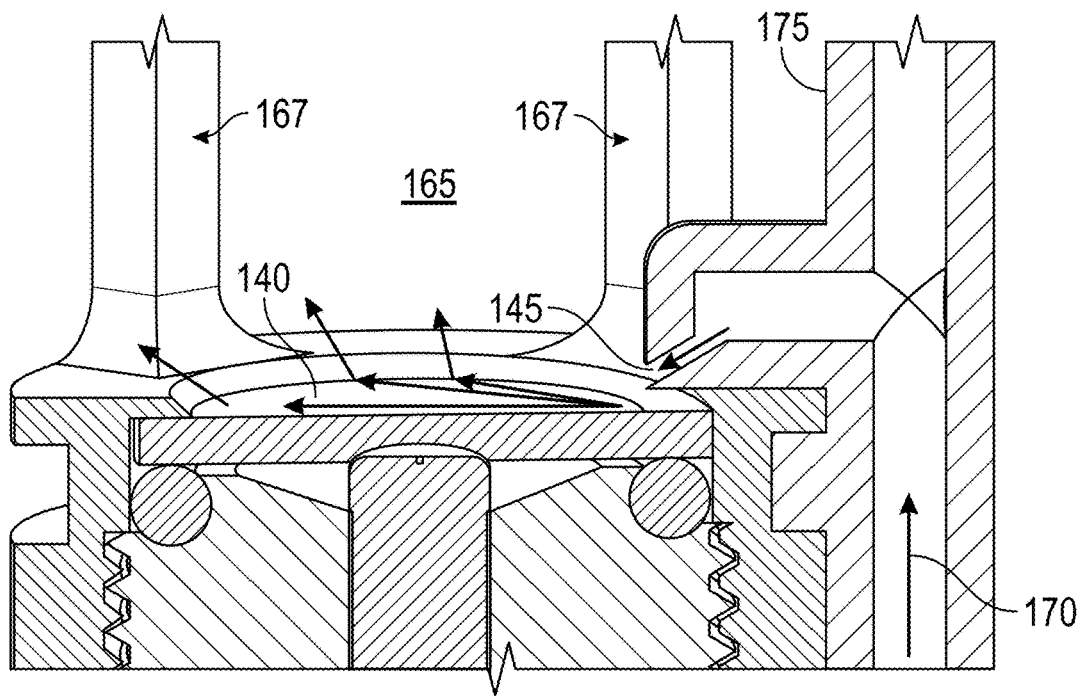
FIG. 3 is a cross-sectional view of aspects of the particle concentration measurement device according to one or more embodiments.

FIG. 3 is a cross-sectional view of aspects of the particle concentration measurement device 100 according to one or more embodiments. The view in FIG. 3 shows the orifice 145 of the container 175 that directs compressed gas 170 onto and across the window 140. As shown, the orifice 145 may be angled to direct the compressed gas 170 directly onto the window 140. According to the arrangement shown in FIG. 1 and FIG. 3, the orifice 145 is angled down because the orifice 145 is above the window 140. While the side of the sensing volume 165 adjacent to the window 140 is detailed in FIG. 3, the arrangement may be similar on the side of the sensing volume 165 that is adjacent to the window 150. That is, the orifice 155 may be angled to direct the compressed gas 170 from the same or another container 175 directly onto the window 150. According to the arrangement shown in FIG. 1 and FIG. 3, the orifice 155 is angled up because the orifice 155 is below the window 150.

Figure 4:
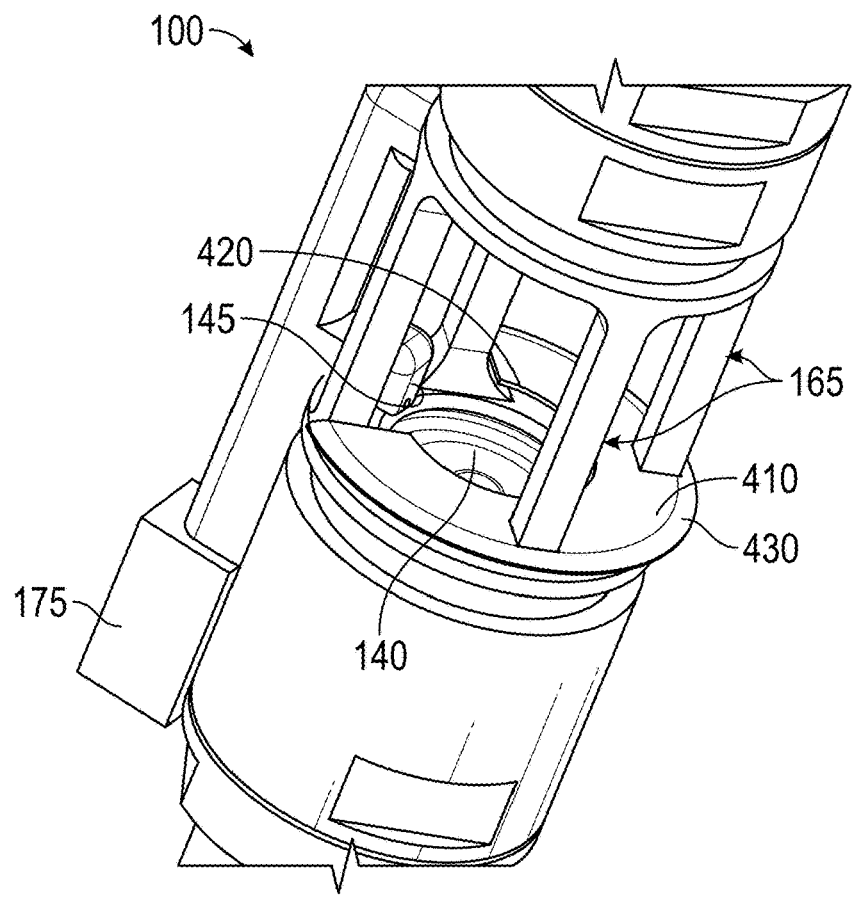
FIG. 4 is an isometric view of aspects of the particle concentration measurement device according to one or more embodiments.

FIG. 4 is an isometric view of aspects of the particle concentration measurement device 100 according to one or more embodiments. The view in FIG. 4 shows a collar 410 between the center 166 of the sensing volume 165 and the window 140. The collar 410 has an inner edge 420 and an outer edge 430. The orifice 145 is between the collar 410 and the window 140. That is, according to the arrangement shown in FIGS. 1 and 4, the orifice 145 is below the collar 410 and above the window 140. The inner edge 420 is closer to the center 166 of the sensing volume 165 than the outer edge 430. As discussed with reference to FIG. 5, the outer edge 430 is shaped to direct the compressed gas 170 from the orifice 145 away from the particle concentration measurement device 100 and, more specifically, away from the sensing volume 165, after it has flowed across the window 140. A similar collar 410 may be arranged, additionally or alternately, below the window 150 according to the arrangement shown in FIGS. 1 and 4. That is, the orifice 155 may be below the window 150 and above the collar 410 that is closer to the window 150 than the window 140.

Figure 5:
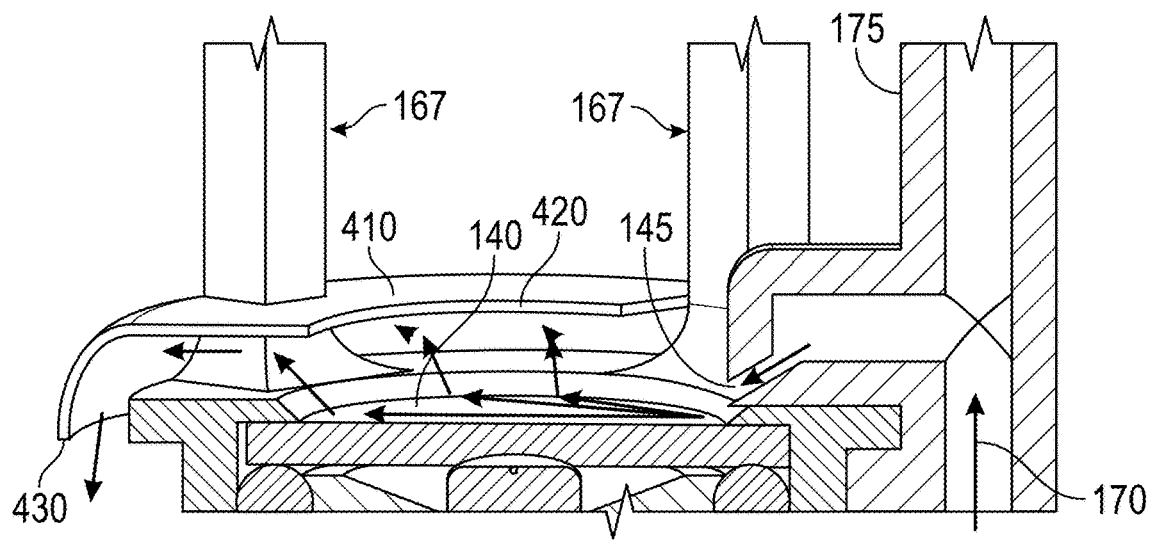
FIG. 5 is a cross-sectional view of aspects of the particle concentration measurement device according to one or more embodiments.

FIG. 5 is a cross-sectional view of aspects of the particle concentration measurement device 100 according to one or more embodiments. The view in FIG. 5 illustrates the functionality of the collar 410 near the window 140. As shown, the outer edge 430 of the collar 410 is shaped (e.g., angled down in the exemplary illustration) so that the compressed air 170 that flowed across the window 140 is directed away from (below) the sensing volume 165. The may ensure that the compressed air 170 does not affect the interaction of the incident light 125 with the particle-laden gas 135 in the sensing volume 165 and, thereby, affect the accuracy of the concentration measurement by the particle concentration measurement device 100.

As noted with reference to FIG. 4, an additional collar 410 or an alternate collar 410 may be arranged closer to the window 150 than the window 140. Based on the arrangement shown in FIGS. 1, 4, and 5, the outer edge 430 of that collar 410 may be shaped (e.g., angled up) so that compressed air 170 that flowed across the window 150 is directed away from (above) the sensing volume 165.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A particle concentration measurement system comprising:
    a first window and a second window separated by a sensing volume;
    one or more supports configured to provide structural support for the first window at a first end and for the second window at a second end, opposite the first end, of each of the one or more supports, wherein the sensing volume defined by the one or more supports and the first window and the second window is open to an environment of the particle concentration measurement system adjacent to the one or more supports such that particle-laden gas from the environment that includes particles mixed with other materials enters the sensing volume;
    a first compressed gas orifice configured to direct a compressed gas onto the first window to clean the first window;

a second compressed gas orifice configured to direct the compressed gas onto the second window to clean the second window; and a first collar disposed between the first window and a center of the sensing volume, the first collar defining a C shape including a gap, wherein the first compressed gas orifice is received in the gap, wherein the first compressed gas orifice is between the first window and the first collar, and the first collar includes a first inner edge and a first outer edge, opposite the first inner edge, the first inner edge being a radially inward edge of the C shape, relative to an axis defined by the C shape and the first outer edge being a radially outward edge of the C shape relative to the axis defined by the C shape, and a first flow of compressed gas from the first compressed gas orifice is directed toward the first outer edge.

2. The particle concentration measurement system according to claim 1, further comprising one or more containers configured to store the compressed gas and channel the compressed gas to the first compressed gas orifice and the second compressed gas orifice.

3. The particle concentration measurement system according to claim 1, further comprising a second collar disposed between the second window and the center of the sensing volume, wherein the second compressed gas orifice is between the second window and the second collar, and the second collar includes a second inner edge and a second outer edge, opposite the second inner edge.

4. The particle concentration measurement system according to claim 3, wherein the first inner edge of the first collar forms an opening for the first window and the second inner edge of the second collar forms an opening for the second window such that the sensing volume extends from the first window to the second window.

5. The particle concentration measurement system according to claim 3, wherein the first outer edge of the first collar and the second outer edge of the second collar are shaped to channel the compressed gas away from the sensing volume.

6. The particle concentration measurement system according to claim 1, further comprising a light source configured to emit incident light into the sensing volume via a fiber optic cable, wherein the incident light enters the sensing volume through the first window and interacts with the particle-laden gas in the sensing volume.

7. The particle concentration measurement system according to claim 6, further comprising a detector configured to detect light intensity following interaction in the sensing volume.

8. The particle concentration measurement system according to claim 7, further comprising a controller configured to determine a concentration of the particles in the particle-laden gas in the interaction region based on the intensity measured by the detector.

9. The particle concentration measurement system according to claim 1, wherein the particles act as a fire suppression agent.

10. The particle concentration measurement system of claim 1, wherein the first collar partially defines an opening through which the first flow is directed away from the sensing volume.

11. A method of assembling a particle concentration measurement system, the method comprising:

arranging a first window and a second window separated by a sensing volume;

arranging one or more supports to provide structural support for the first window at a first end and for the second window at a second end, opposite the first end, of each of the one or more supports, wherein the sensing volume defined by the one or more supports and the first window and the second window is open to an environment of the particle concentration measurement system adjacent to the one or more supports such that particle-laden gas from the environment that includes particles mixed with other materials enters the sensing volume;

arranging a first compressed gas orifice to direct a compressed gas onto the first window to clean the first window;

arranging a second compressed gas orifice to direct the compressed gas onto the second window to clean the second window;

a first collar disposed between the first window and a center of the sensing volume the first collar defining a C shape including a gap, wherein the first compressed gas orifice is received in the gap and is between the first window and the first collar, and the first collar includes a first inner edge and a first outer edge, opposite the first inner edge, the first inner edge being a radially inward edge of the defined C shape, relative to an axis defined by the C shape, and the first outer edge being a radially outward edge of the defined C shape relative to the axis defined by the C shape, and a first flow of compressed gas from the first compressed gas orifice is directed toward the outer edge.

12. The method according to claim 11, further comprising disposing one or more containers to store the compressed gas and channel the compressed gas to the first compressed gas orifice and the second compressed gas orifice.

13. The method according to claim 11, further comprising arranging a second collar disposed between the second window and the center of the sensing volume, wherein the second compressed gas orifice is between the second window and the second collar, and the second collar includes a second inner edge and a second outer edge, opposite the second inner edge.

14. The method according to claim 13, wherein the arranging the first collar includes the first inner edge of the first collar forming an opening for the first window and the arranging the second collar includes the second inner edge of the second collar forming an opening for the second window such that the sensing volume extends from the first window to the second window.

15. The method according to claim 13, wherein the arranging the first collar and the second collar includes the first outer edge of the first collar and the second outer edge of the second collar being shaped to channel the compressed gas away from the sensing volume.

16. The method according to claim 11, further comprising arranging a light source to emit incident light into the sensing volume via a fiber optic cable, wherein the incident light enters the sensing volume through the first window and interacts with the particle-laden gas in the sensing volume.

17. The method according to claim 16, further comprising arranging a detector to detect light intensity following interaction in the sensing volume.

18. The method according to claim 17, further comprising configuring a controller to determine a concentration of the particles in the particle-laden gas in the interaction region based on the intensity measured by the detector.

19. The method according to claim 11, wherein determining the concentration of the particles includes determining the concentration of a fire suppression agent.

20. The particle concentration measurement system of claim 11, wherein the first collar partially defines an opening through which the first flow is directed away from the sensing volume.

* * * * *